United States Patent [19]
Cordes

[11] Patent Number: 5,132,849
[45] Date of Patent: Jul. 21, 1992

[54] ILLUMINATED CURSOR MAGNIFYING GLASS

[75] Inventor: Werner Cordes, Hamburg, Fed. Rep. of Germany

[73] Assignee: Aristo Graphic Systeme GmbH KG, Hamburg, Fed. Rep. of Germany

[21] Appl. No.: 520,805

[22] Filed: May 9, 1990

[30] Foreign Application Priority Data

May 9, 1989 [DE] Fed. Rep. of Germany ....... 3915118
Nov. 6, 1989 [DE] Fed. Rep. of Germany ....... 3936833

[51] Int. Cl.$^5$ ............................................. G02B 27/02
[52] U.S. Cl. .................................... 359/798; 359/810; 359/827; 362/31; 362/109
[58] Field of Search .............. 359/798, 808, 809, 817, 359/894, 896, 811, 810, 818, 827; 362/26, 30, 31, 109

[56] References Cited

U.S. PATENT DOCUMENTS

| | | | |
|---|---|---|---|
| 3,500,034 | 3/1970 | Bissell | 359/798 |
| 3,604,919 | 9/1971 | MacPherson | 362/31 |
| 3,663,096 | 5/1972 | Fuller | 359/798 |
| 4,062,030 | 12/1977 | Starp | 359/827 |
| 4,479,032 | 10/1984 | Parnell | |
| 4,526,440 | 7/1985 | Lundburg et al. | 359/827 |
| 4,693,554 | 9/1987 | Cordes | 359/810 |
| 4,763,986 | 8/1988 | Sego | 359/798 |
| 5,021,933 | 6/1991 | Cordes | 362/109 |

FOREIGN PATENT DOCUMENTS

3520293C1 4/1986 Fed. Rep. of Germany .

*Primary Examiner*—Loha Ben
*Attorney, Agent, or Firm*—Fitzpatrick, Cella, Harper & Scinto

[57] ABSTRACT

A cursor magnifying glass arrangement has a support body for holding a magnifying glass body having a cylindrical portion and a lens section. The cylindrical portion is rotationally symmetrical with respect to the cylindrical axis and is convexly curved. An evaluation coil is disposed coaxially to the cylindrical portion. The lens body is removably, preferably interconnectedly, supported in the support body, and the evaluation coil is fixed on the support body radially outside of the path of the edge light beam of the lens section.

19 Claims, 3 Drawing Sheets

ILLUMINATED CURSOR MAGNIFYING GLASS

BACKGROUND OF THE INVENTION

1. Field of the Invention

The present invention relates to a cursor magnifying glass arrangement including a support body and a magnifying glass body having a cylindrical portion and a convexly curved lens section. Both the cylindrical portion and the curved lens section are rotationally symmetrical with respect to the cylindrical axis of the cylindrical portion. An evaluation coil means is disposed coaxially with respect to the cylindrical portion.

2. Background of the Invention

In connection with a known cursor magnifying glass arrangement of this type (see for example German Patent DE-PS 35 20 293), which is particularly suitable for use in connection with digitizing tablets, an evaluation coil means for the generation or detection of a magnetic field is disposed in the outer circumferential area of the cylindrical portion. This evaluation coil means is placed in such a way that it is located in the area between the circumferential surface of the cylindrical portion and the path of edge light beams passing through the edge of the lens section and the cylindrical portion. Therefore, the evaluation coil means is not visible to the viewer when looking through the body of the magnifying glass at the data on the digitizer. This is because the beam of light falling vertically with respect to the data on the outer edge of the lens section is deflected inwardly by the lens section in the direction of the cylindrical axis in such a way that, between it and the outer circumferential surface of the cylindrical portion, an area remains which is unrecognizable to the viewer because of the optical course of the edge light beam. For this reason, an evaluation coil means located in this area is not visible and the viewer only has the impression that this part of the lens body is "opaque".

The evaluation coil means of this known cursor magnifying glass arrangement is disposed with its terminal ends extending through the cylinder body and into the support body where they are connected with a switching device supported in the support body.

For different types of digitizing tablets, manufacturers of digitizing tablets generally provide cursor magnifying glass arrangements comprising different magnifying glass bodies, so that it becomes necessary to use, for each type of digitizing tablet, a magnifying glass arrangement with a magnifying glass body adapted to that digitizer and with a support body which firmly supports it. In addition to this, different magnifying glass bodies are suitable for different applications, so that the user requires specifically designed cursor magnifying glass arrangements, which can be expensive.

OBJECT AND SUMMARY OF THE INVENTION

It is an object of the present invention to provide a cursor magnifying glass arrangement which can be easily adapted to various types of digitizing tablets and/or different applications.

To attain this object, a cursor magnifying glass body according to the present invention is designed in such a way that the magnifying glass body is removably disposed in the support body, and the evaluation coil means is fastened to the support body outside of the path of the edge light beam in the lens section.

In the cursor magnifying glass arrangement according to the present invention, the evaluation coil means lies outside of the area which can be seen through the magnifying glass body, but inside the support body which contains the magnifying glass body, so that the electrical connection between the evaluation coil means and the associated switching device also extends completely inside the support body. The magnifying glass body is removably disposed in the support body so that different magnifying glass bodies can be inserted into the carrier body. This allows the manufacturer, in adaptation to the respective type of digitizing tablet for which the cursor magnifying glass is intended, and the user, in adaptation to the intended use, to utilize a magnifying glass body with suitable optical properties without the need for additional changes in the cursor magnifying glass arrangement.

The magnifying glass body also may be provided with cross hairs to permit exact positioning with respect to the points to be digitized.

If the cursor magnifying glass arrangement of the present invention is not correctly handled, it is possible that the inserted magnifying glass body can be pushed upward out of its seat in the support body. This does not present a serious problem, provided that the displacement of the magnifying glass body takes place in such a way that it is no longer held in the support body, since the user would immediately notice this misalignment. However, if there has been only a small displacement of the magnifying glass body with respect to the support body, it may be possible that the user would not notice this and would continue to employ the cursor magnifying glass arrangement, which could result in incorrect measurements.

To avoid these difficulties, the magnifying glass body of the present invention may be inserted into the support body and be brought into interlocking connection with the support body.

Such interlocking connection between the removable magnifying glass body and the support body makes it impossible for the magnifying glass body to become unseated from its position inside the support body by simple pressure from below. Displacement of the magnifying lens body is only possible after the interlocking connection has been opened.

To provide an interlocking connection between the magnifying glass body and the support body, a hook element may be provided in the area of the magnifying glass body located immediately above the support body, the free end section of the hook element being oriented in the direction of the circumference of the magnifying glass body. The hook element end section is in removable contact with a seat provided on the top surface of the support body, which seat has a support area at least on a side opposite a top surface of the support body. Preferably the hook element is integral with the magnifying glass body.

If, in the inserted position of the magnifying glass body, the free end section of the hook element extends into the seat on the support body, this seat supports the free end section of the hook element and thus the entire magnifying glass body. This means that the magnifying glass body cannot accidentally be displaced from its defined position in the support body for the taking of measurements.

To remove the magnifying glass body from the support body, it is necessary to turn it with respect to the support body in such a way that the free end section of the hook element is moved out of the seat in the support body. The magnifying glass body then can be upwardly moved out of the support body without noticeable difficulty.

To attain a definite guidance of the magnifying glass body inside the support body during turning, and particularly to limit the turning to a path of positive interlocking in a definite manner, a protrusion may be formed on the magnifying glass body beneath the hook element. Such a protrusion extends into a recess, open at the top and formed in the wall of a retaining opening of the support body, when the magnifying glass body is inserted therein. In the position of interlocked connection, the protrusion is located at one end of the recess. In the position where the interlocking connection has been loosened, the protrusion is at the other end of the recess.

In one embodiment in accordance with the present invention, at least one lamp may be disposed in the cylindrical lens portion in the area between its circumferential surface and the path of the edge light beam of the lens section passing through the cylindrical portion. An air gap is formed at least in the central area between the cylindrical portion and the magnifying lens section and the light emitted, by at least one lamp, substantially totally is reflected at the surface of the cylindrical portion adjacent the air gap.

Therefore, in such a design, at least one lamp is disposed in the area of the cylindrical portion which is not visible to the viewer because of the optical properties of the lens section. The light from this lamp passes through the cylindrical portion onto a surface which limits the gap between the cylindrical portion and the lens section and is substantially totally reflected by this surface. In other words, the light emitted by the lamp in the direction of the lens section is reflected away from the lens section and onto the surface to be viewed in order to illuminate it. However, and as previously mentioned, the actual light source is not visible to the user, so that it does not interfere with the use of the magnifying glass arrangement.

The light from at least one lamp falling onto the surface to be viewed is suitably refracted by the cylindrical portion, and reaches the eye of the viewer from there through the lens section. Only a very small part of this light again falls onto the surface of the cylindrical portion, by limiting the air gap at such an angle that it is reflected away from the viewer.

It should be noted in this connection that the determination of the shape of the surface of the cylindrical portion where total reflection is to take place is made in accordance with well-known optical design rules, taking into consideration the differences in optical densities between the material of the cylindrical portion (normally glass or acrylic glass) and the air. The thickness of the air gap should be as small as possible in order to prevent optical distortions. For this purpose, the surface of the cylindrical portion limiting the air gap is generally concavely curved upward.

The air gap is preferably disposed rotationally symmetrical with respect to the cylindrical axis of the cylindrical portion. The air gap may extend as far as the area of the edge light beam of the lens section, so as to cause total reflection of all the light emitted upwardly or obliquely upwardly by the lamp.

Preferably, a plurality of lamps, placed diametrically opposite to each other in pairs, are used. The lamps may be disposed in an annular groove formed in the cylindrical portion and which is radially open towards the outside so that the lamps can be easily mounted and removed.

In a cursor magnifying glass arrangement in accordance with the present invention and including a hook element and at least one lamp, the connecting wires for the lamp may end in contacts provided on the outer surfaces of the free end section of the hook element. Such contacts may be connected, in the interlocking position, to contacts on the support body which are connected with an electrical power source. In this way, it is possible, on the one hand, to connect the connecting wires for the lamp running on or in the magnifying glass body with suitable contacts. On the other hand, it is possible by means of this connection to make definite electrical contact between the contacts on the magnifying glass body and the contacts on the support body, without the requiring additional steps to be taken by the user.

The present invention will be described in detail below by means of the drawings which show exemplary embodiments thereof.

DETAILED DESCRIPTION OF THE PREFERRED EMBODIMENTS

Figure 1:
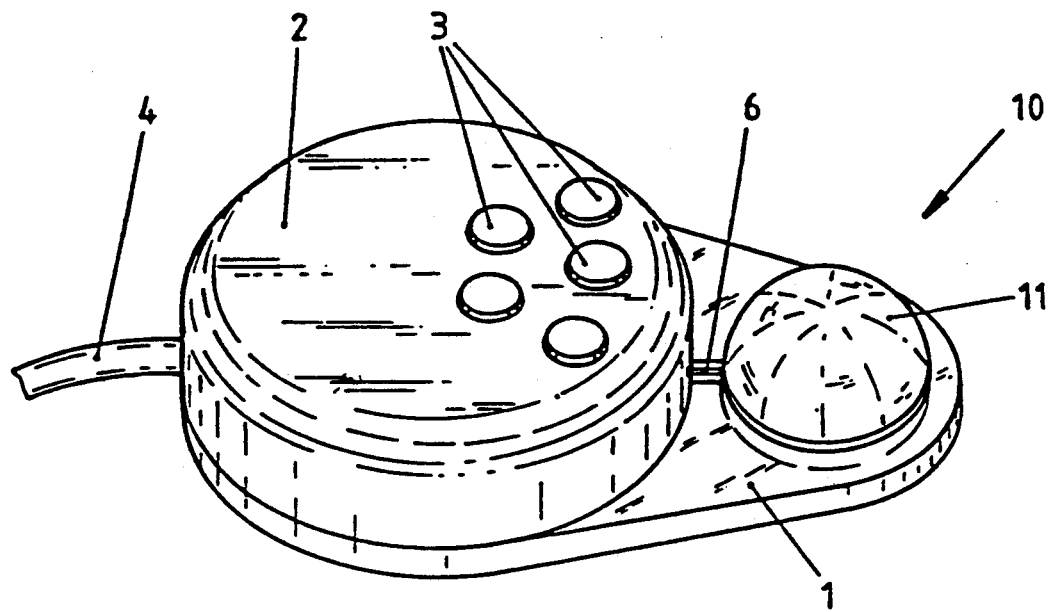
FIG. 1 is a perspective view of a cursor magnifying glass arrangement according to a first embodiment of the present invention.
Figure 2:
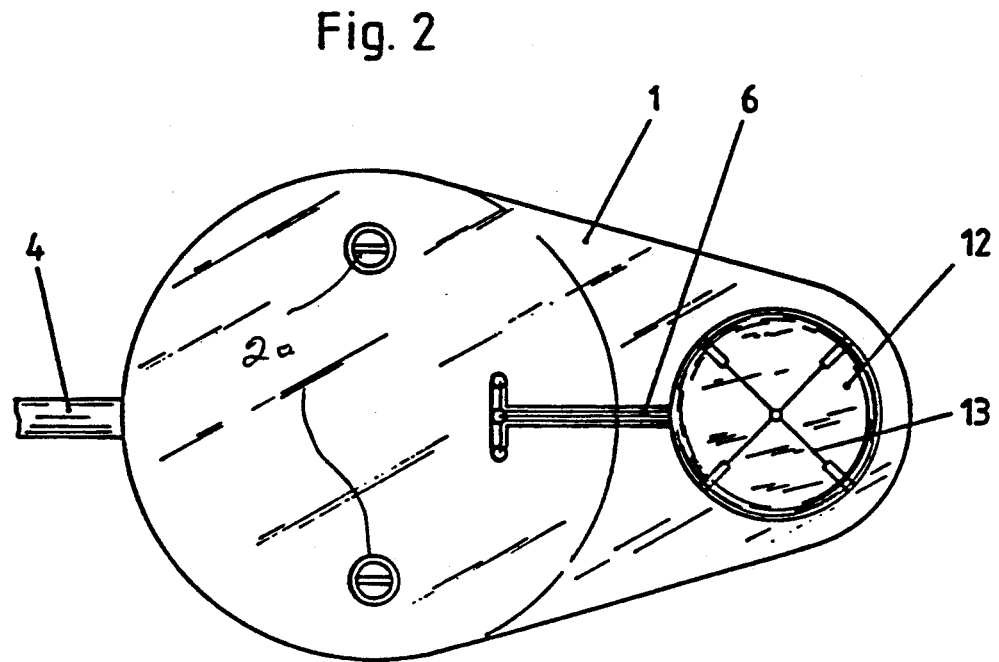
FIG. 2 is a bottom view of the cursor magnifying glass arrangement shown in FIG. 1.
Figure 3:
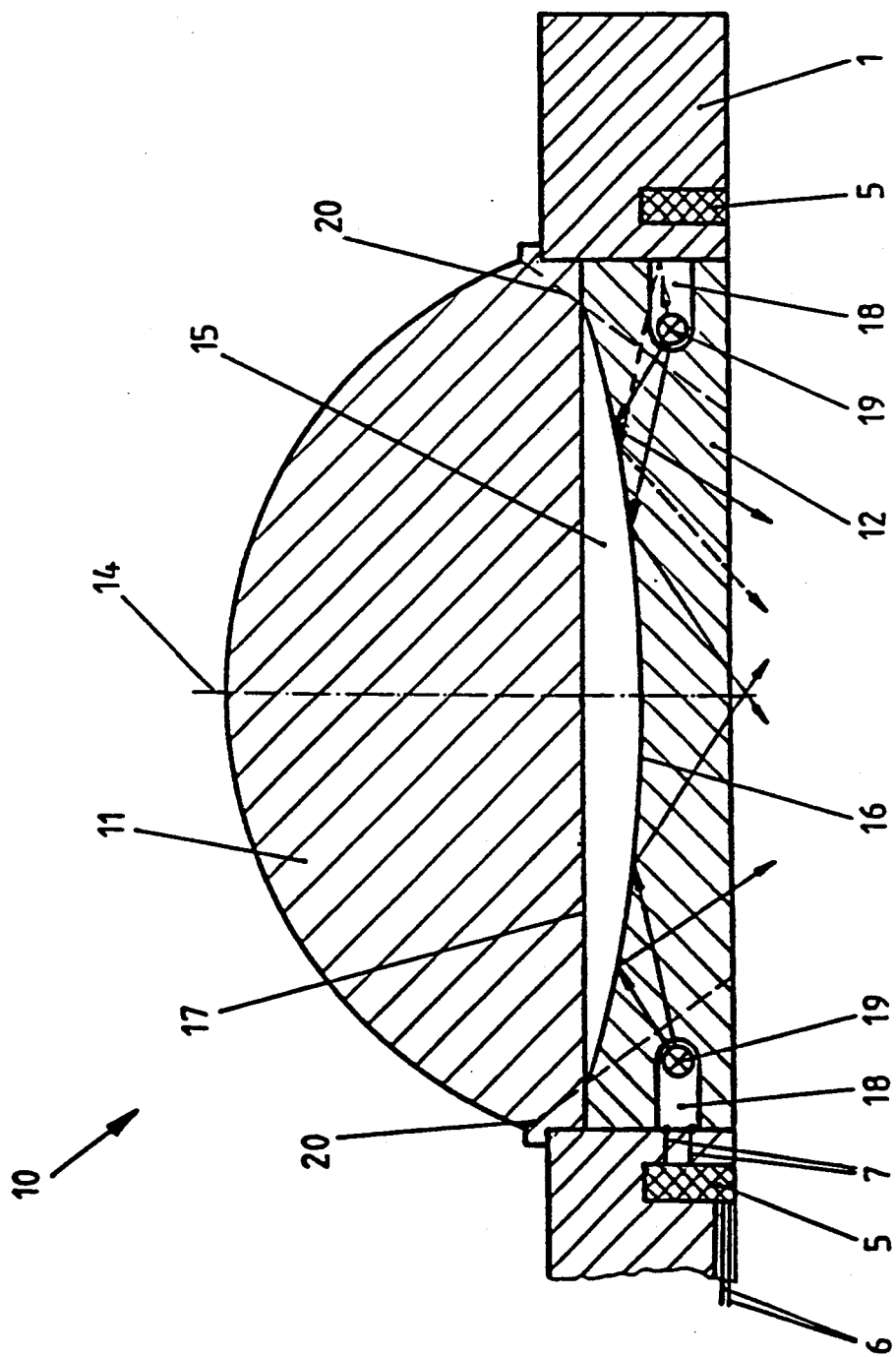
FIG. 3 is a partial cross-sectional view of the area of the magnifying glass body of the cursor magnifying glass arrangement of FIGS. 1 and 2.

The cursor magnifying glass arrangement illustrated in FIGS. 1 to 3 comprises a support body 1 of optical acrylic plastic, on which a housing 2 is fixed by means of screws 2a (FIG. 2). A switching device (not shown) is disposed in the housing 2 and is operated by means of pushbuttons 3 provided on the top surface of the housing 2. The switching device is connected via a line 4 to an operating circuit (not shown), and to an electrical power source (also not shown). The design and functions of such a switching device are known and therefore will not be described herein.

A through-bore is located in the support body 1 and is concentrically surrounded by an evaluation coil means 5 (FIG. 3) inserted into a downwardly open annular groove in the support body 1. The evaluation coil means 5 is connected to the switching device provided in the housing 2 via lines 6. A lens body 10 is inserted into the through-bore and may also be made of optical acrylic plastic, for example. The lens body 10 has a cylindrical portion 12 as well as a lens section 11 which is curved with rotational symmetry with respect to the cylindrical axis 14. The outer circumferential areas of the lens section 11 and of the cylindrical portion 12 adjoin each other in a plane and may be fixedly connected to each other by means of an adhesive of the same optical density as the material of the lens section 11 and of the cylindrical portion 12. A narrow air gap 15 is formed in the central area between the lens section 11 and the cylindrical portion 12. This gap is rotationally symmetrical with respect to the cylindrical axis 14, and extends as far as the area of the edge light beam 20 in the lens section. The air gap 15 is limited by a flat surface 17 of the lens section 11 and a concave surface 16 of the cylindrical portion 12.

An annular groove 18, radially open towards the outside, is located in the outer circumference of the cylindrical portion 12 wherein and a plurality of lamps 19 are held therein a known manner not shown in detail. Pairs of these lamps, as shown in FIG. 3, are diametrically opposed to each other. The lamps 19 are connected via connecting wires (not shown) to contacts provided on the outer circumference of the cylindrical portion 12 which, when the lens body 10 has been inserted into the support body 1, are in contact with connecting lines 7 (FIG. 3). The connecting lens, in a manner not shown in detail, then lead into the housing 2 and are connected with an electrical power source for the lamps 19. One of the pushbuttons 3 can be used for turning the lamps 19 off or on.

Because the lamps 19, as well as the evaluation coil means 5, are located radially outside of an area inwardly delimited by the indicated edge light beam 20 (FIG. 3) in the lens section 11, the lamps 19 are located in an area that is not visible to the user.

The light emitted by the lamps 19 in an upward and obliquely upward direction falls, as indicated by the arrows, onto the concave surface 16 of the cylindrical portion 12. This light is substantially totally reflected by this surface because of the shape thereof, and because of the differences in optical density between the material of the cylindrical portion 12 and the air in the air gap 15. In other words, the light reaches, in the manner indicated by the arrows, the surface which is to be viewed through the magnifying glass body 10. In this manner the area to be viewed is well illuminated and the user can clearly see the designs on the surface to be viewed as well as cross hairs 13 formed on the underside of the cylindrical portion 12 (FIG. 2), without the presence of the light source interfering with the use of the cursor magnifying glass arrangement.

As shown in particular in FIG. 3, the magnifying glass body 10, which is supported on the top surface of the support body 1 with an annular shoulder formed on the lens section 11, easily can be removed upwardly from the support body 1. Another magnifying glass body of a size adapted to the through-bore in the support body 1 then can be inserted into the support body 1. The newly inserted magnifying glass body may have, for example, different optical properties or may not include any lamps.

Figure 4:
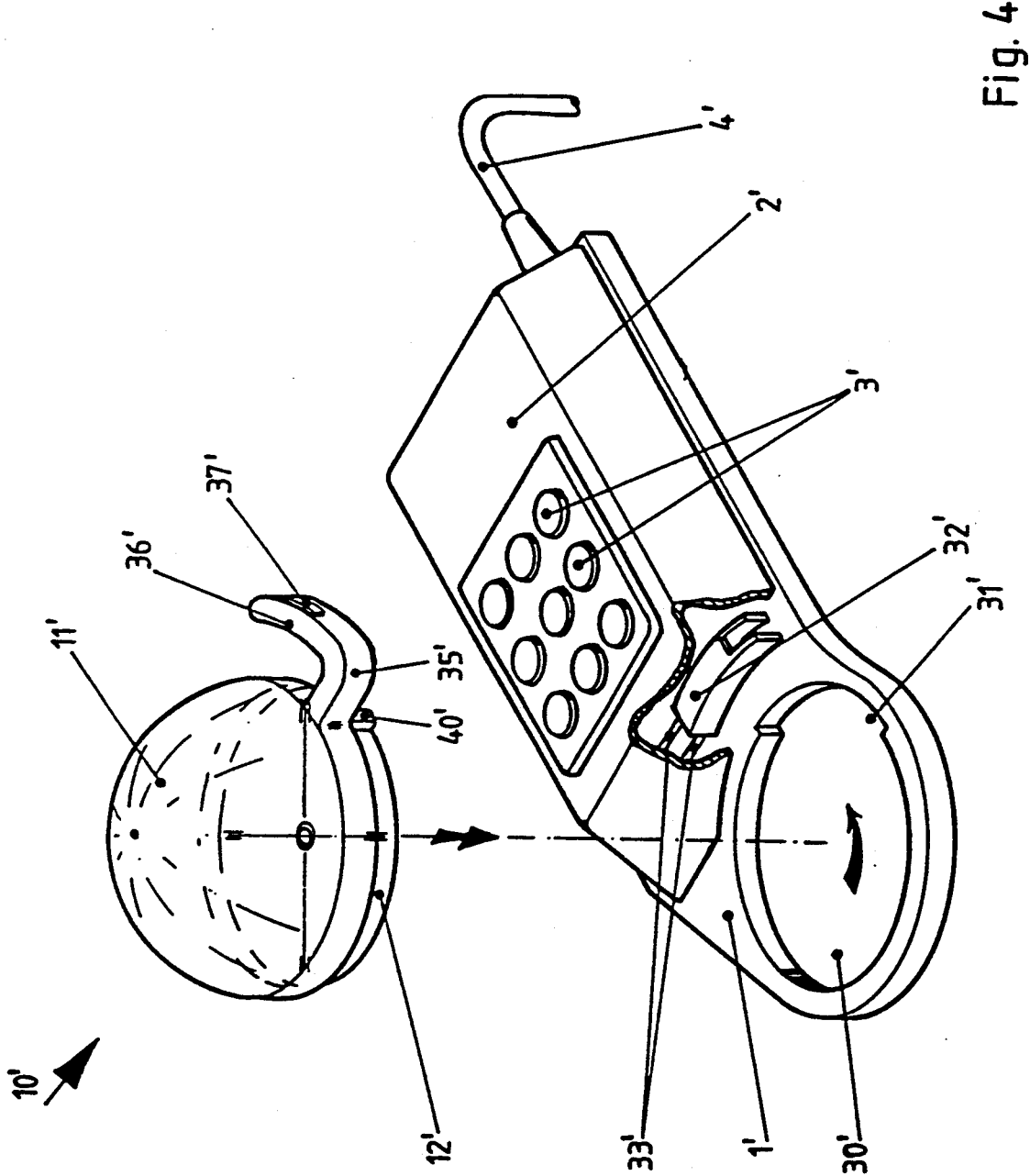
FIG. 4 is a perspective view of a cursor magnifying glass arrangement according to a second embodiment of the present invention, partially opened.

The cursor magnifying glass arrangement illustrated in FIG. 4 has a flat support body 1' of optical acrylic plastic on which, in a manner not shown, a housing 2' is fixed. A switching device is located in the housing 2', the operation of which is triggered by means of pushbuttons 3' provided on the top surface of the housing 2', and which is connected with an operating circuit as well as with an electrical power source via a line 4'. As mentioned above, the construction and functions of such a switching device are known and, therefore, are not further discussed herein.

A receiving opening or through-bore 30' is provided in the support body 1' and concentrically is surrounded by an evaluation coil means not shown, as illustrated in the exemplary embodiment in accordance with FIGS. 1 to 3.

The illustrated lens body 10' may, for example, also be comprised of optical acrylic plastic and comprises a cylindrical portion 12' and a lens section 11', both of which being rotationally symmetrically curved with respect to the cylindrical axis. The lens section 11' and the cylindrical portion 12' may be designed in the manner described in connection with FIGS. 1 to 3.

In the lower area of the lens section 11', a hook element 35' is disposed on the lens body 10' and has a free end section 36' which is curved approximately in the circumferential direction of the cylindrical portion 12' or of the adjoining area of the lens section 11'. A protrusion 40' is formed on the cylindrical portion 12' below the hook element 35'.

As indicated in FIG. 4, insertion of the lens body 10' onto the support body 1' is performed in the way indicated by the arrows. First the lens body 10' is inserted into the through-bore 30', so that its cylindrical portion 12' is in contact with the area of the wall of the through-bore 30'. This insertion is performed in such a way that the protrusion 40' abuts the near end of the a recess 31' which has been formed in the wall of the through-bore 30' and which extends in a circumferential direction. If the lens body 10' is in this inserted position, it is turned in the direction of the arrow and the protrusion 40' is displaced from the near end of the recess 31' to the end located in the back in FIG. 4. In the course of this turn, the free end section 36' of the hook element 35' comes into engagement with the seat 32' which is disposed on the top surface of the support body 1' and which tightly surrounds the free end section 36' on all sides. In this way, an interlocked connection between the lens body 10' and the support body 1' is provided and the lens body 10' can no longer be upwardly pushed out of the support body 1', or displaced therefrom.

As indicated in FIG. 4, contacts 37' are disposed on the outside of the free end section 36' of the hook element 35'. Connecting wires extend from the contacts 37' to the lamps 19 which are, if desired, present in the lens body 10'. The positioning and mode of operation of the lamps 19 have been illustrated in FIGS. 1 to 3 and have been described in connection therewith. When the free end section 36' of the hook element 35' extends into the seat 32', the contacts 37' are connected with corresponding contacts provided in the seat 32'. Wires 33', in turn connect a source of electricity via the wires 4', to the corresponding contacts.

While exemplary embodiments of the invention have been shown and described, it is to be understood that the invention is only to be limited by the scope of the appended claims.

I claim:

1. A cursor magnifying glass device with a support body (1, 1') supporting a magnifying glass body (10, 10') having a cylindrical portion (12, 12') and a lens section (11, 11'), the cylindrical portion being rotationally symmetrical with respect to the cylindrical axis (14) thereof and having a convexly curved surface, the device also having an evaluation coil means (5) disposed coaxially with the cylindrical portion, for emitting or detecting electromagnetic waves, comprising:
   means on the magnifying glass body for removably supporting same in the support body; and
   means for fixing the evaluation coil means radially in the support body outside of a path of an edge light beam (20) in the lens section.

2. A cursor magnifying glass device in accordance with claim 1, further including cross hairs disposed on an underside of the magnifying glass body.

3. A cursor magnifying glass device in accordance with claim 1, wherein said means for removably supporting the magnifying glass body in the support body includes means for interlockingly connecting the magnifying glass body with the support body.

4. A cursor magnifying glass device in accordance with claim 1, further comprising:
   a hook element (35') coupled to a circumferential area of the magnifying glass body, a free end section (36') of said hook element being oriented substantially in the circumferential direction of the magnifying glass body; and
   a seat (32') provided on a top surface of the support body and having a support area at least on a side opposite the top surface of the support body, for providing a mating contact for said hook element.

5. A cursor magnifying glass device in accordance with claim 4, wherein said hook element is integral with the magnifying glass body.

6. A cursor magnifying glass device in accordance with claim 4, further comprising:
   a protrusion (40') formed on the magnifying glass body below said hook element (35');
   a receiving opening (30') formed in said support body, for receiving the magnifying glass body (10'); and
   an upwardly open recess (31') formed in a wall of said receiving opening, for receiving said protrusion when the magnifying glass body is inserted into the support body, said recess having two ends positioned such that said protrusion is located at one end of the recess when an interlocking connection is made between the magnifying glass body and the support body, and is located at the other end of the recess when the interlocking connection is opened.

7. A cursor magnifying glass device in accordance with claim 1, further comrising:
   at least one lamp (19) disposed in the cylindrical portion (12) in an area between a circumferential surface thereof and the path of the edge light beam (20) in the lens section (11) passing through the cylindrical portion; and
   an air gap (15) provided at least in a central section of the magnifying glass body between the cylindrical portion and the lens section, for causing light emitted by said at least one lamp to be substantially totally reflected from a surface of the cylindrical portion adjacent the air gap.

8. A cursor magnifying glass device in accordance with claim 7, wherein said air gap is rotationally symmetrical with respect to the cylindrical axis.

9. A cursor magnifying glass device in accordance with claim 7, wherein said air gap extends as far as the path of the edge light beam in the lens section.

10. A cursor magnifying glass device in accordance with claim 7, wherein said surface (16) of the cylindrical portion (12) adjacent the air gap (15) is concavely curved.

11. A cursor magnifying glass device in accordance with claim 7, further comprising an outwardly radially open annular groove (18) provided in the cylindrical portion (12), for holding said at least one lamp.

12. A cursor magnifying glass device in accordance with claim 7, wherein said at least one lamp comprises a plurality of lamps located in pairs diametrically opposed to each other with respect to the cylindrical axis.

13. A cursor magnifying glass device in accordance with claim 7, further comprising:
   a hook element (35') coupled to the magnifying glass body and having electrical contacts (37') on an outer surface thereof, for providing an interlocking connection with the support body;
   a seat (32') disposed on the support body and having electrical contacts, for providing interlocking connection with said hook element, the electrical contacts of said hook element and said seat coming into contact when the interlocking connection is established; and
   connecting wires connecting said at least one lamp to said hook element electrical contacts.

14. A magnifying glass device comprising:
   a support body;
   a magnifying glass body having a cylindrical section and a lens section;
   an evaluation coil means disposed substantially adjacent a circumferential surface of said cylindrical section, for emitting or detecting electromagnetic waves; and
   connecting means, coupled to said magnifying glass body, for removably coupling said magnifying glass body to said support body, wherein said connecting means comprises a hook-like element extending in a circumferential direction of said cylindrical section, and further comprising a curved seat, coupled to said support body, for holding said hook-like element when said magnifying glass body is coupled to said support body.

15. A device according to claim 14, further comprising electrical contacts disposed on both of said hook-like element and said seat, for providing electrical contact between said magnifying glass body and said support body when they are coupled together.

16. A device according to claim 15, further comprising:
   at least one cavity in the circumferential surface of said cylindrical section; and at least one light emitting device disposed in said at least one cavity at a position between the circumferential surface of said cylindrical section and a path of an edge light beam in said lens section, said at least one light emitting device being electrically coupled to said electrical contacts on said hook-like element.

17. A device according to claim 16, further comprising an air gap between said cylindrical section and said lens section, a surface of said cylindrical section adjacent said air gap being concavely curved to cause light emitted from said at least one light emitting device to be substantially totally reflected off said curved surface away from said lens section.

18. A device according to claim 14, further comprising:
   a seating area disposed in said support body, for receiving said magnifying glass body when they are coupled together, said seating area having an arcuate groove in an outer wall thereof; and
   a protrusion coupled to said magnifying glass body, for fitting into said arcuate groove and traveling from one end to the other end thereof.

19. An illuminated optical digitizer cursor, comprising:
   a support body;
   an optical section removably coupled to said support body and having a lens section disposed on a cylindrical section with an air gap therebetween, a surface of said cylindrical section adjacent the air gap being concavely curved upward;
   an electromagnetic coil means disposed in said support body substantially surrounding said optical section, for emitting or detecting electromagnetic waves;

a light emitting device disposed in said cylindrical section at a position between an outer circumferential surface thereof and a path of an edge light beam in said lens section, light emitted from said light emitting device being substantially totally reflected from said curved surface of said cylindrical section;

an interlocking member, coupled to said optical section, for removably interlocking said optical section to said support body; and a coupling member, coupled to said support body, for interlocking with said interlocking member when said optical section is coupled to said support body.

* * * * *